United States Patent
Standbridge et al.

(10) Patent No.: US 9,726,295 B2
(45) Date of Patent: Aug. 8, 2017

(54) MODULAR STOP FOR VALVE

(71) Applicant: HI-KALIBRE EQUIPMENT LIMITED, Edmonton (CA)

(72) Inventors: Tony Charles Leon Standbridge, Edmonton (CA); Patrick Kenneth Rabby, Sherwood Park (CA); Guy Lenner, Edmonton (CA)

(73) Assignee: HI-KALIBRE EQUIPMENT LIMITED, Edmonton, Alberta (CA)

( * ) Notice: Subject to any disclaimer, the term of this patent is extended or adjusted under 35 U.S.C. 154(b) by 0 days.

(21) Appl. No.: 15/072,107

(22) Filed: Mar. 16, 2016

(65) Prior Publication Data

US 2016/0281864 A1    Sep. 29, 2016

Related U.S. Application Data

(60) Provisional application No. 62/138,865, filed on Mar. 26, 2015.

(51) Int. Cl.
*F16K 5/08* (2006.01)
*F16K 5/06* (2006.01)
*F16K 27/06* (2006.01)

(52) U.S. Cl.
CPC .............. *F16K 5/08* (2013.01); *F16K 5/0642* (2013.01); *F16K 5/0647* (2013.01); *F16K 27/067* (2013.01); *Y10T 137/0508* (2015.04)

(58) Field of Classification Search
CPC ........ F16K 5/08; F16K 27/067; F16K 5/0647; F16K 5/0642; Y10T 137/0508

USPC ..... 251/315.01–315.16, 286–288; 137/15.22
See application file for complete search history.

(56) References Cited

U.S. PATENT DOCUMENTS

| | | | | |
|---|---|---|---|---|
| 3,107,546 | A * | 10/1963 | Rowland | F16K 5/0647 251/288 |
| 4,635,675 | A | 1/1987 | Walter | |
| 4,714,235 | A | 12/1987 | Brown et al. | |
| 5,139,230 | A | 8/1992 | Lester | |
| 5,188,335 | A * | 2/1993 | Pettinaroli | F16K 35/06 137/315.18 |
| 5,246,203 | A * | 9/1993 | McKnight | E21B 21/106 137/454.2 |
| 6,681,793 | B2 * | 1/2004 | Mike | F16K 5/0636 137/15.22 |
| 7,325,782 | B2 * | 2/2008 | Gebler | F16K 31/003 251/129.11 |
| 8,714,518 | B2 | 5/2014 | Combs | |

* cited by examiner

*Primary Examiner* — John Bastianelli
(74) *Attorney, Agent, or Firm* — Dentons US LLP; Brian R. McGinley

(57) ABSTRACT

A modular stop is provided for ball valves, such as those used as drill stem safety valves. The modular stop can be a replaceable component in valves for use with stems used to rotate a ball valve in the valve's body. The modular stop can bear the wear associated with the operation of ball valves and when the modular stop has exceeded its usable service life, it can be replaced without replacing the whole of the valve body. The modular stop can be used in new valve manufacture as well as in the retrofitting or remanufacturing of existing valves.

32 Claims, 5 Drawing Sheets

MODULAR STOP FOR VALVE

CROSS-REFERENCE TO RELATED APPLICATIONS

This application claims priority of U.S. provisional patent application Ser. No. 62/138,865 filed Mar. 26, 2015, which is incorporated by reference into this application in its entirety.

TECHNICAL FIELD

The present disclosure is related to the field of modular stops for valves, in particular, ball valves used in drill stem safety valves in a drill string.

BACKGROUND

Drill stem safety valves ("DSSV") typically have two primary purposes: a) they are safety devices that can be closed to prevent mud and/or well fluid from flowing back up the interior of the drill pipe in the event of an unbalanced pressure in the mud column; and b) they can be used as a flow control device to turn on and off the flow of mud while making and breaking connections during drilling operations for top drives.

When used for blow out prevention, these valves are only used during testing or in emergencies. However, in mud control, they can be operated several hundred times in the drilling of a single well.

Drilling mud is an abrasive, highly engineered fluid that is used to balance pressure in the string against pressure in the pay zone upon point of penetration. The abrasiveness of the fluid is due to entrained solids such as sand. Well fluids are any hydrocarbons in the pay zone, and can include a mixture of oil, gas and solids.

To operate a DSSV, it is simply turned from the open to closed position and back again, by applying torque to the DSSV stem. This torque can be applied manually, or by an actuator. The stem in the valve is a part which penetrates the pressure envelope. It typically has a hexagonal interface to receive a wrench that can be used to open or close the valve.

The body of the valve is the part which houses all the internal parts. The body is typically constructed of high strength carbon steel alloy due to the extremely high pressure, torque and tension it is subjected to as part of the drill string. This type of alloy is selected for its strength, but as such is not very corrosion resistant and cannot be welded because welding introduces localized hardening that can cause premature failure under high loads.

Under pressure, the valve takes a significant amount of torque to operate. Some valves require upwards of 2000 foot-pounds ("ft-lbs") to operate. This torque can be applied manually by wrench, or by actuator. Because of this, there is substantial load on the hexagonal stem, and conversely when the valve reaches its full travel, this load is transferred to the "valve stop".

The stops in the valve are the contact areas between the stem and, typically, a stop ring or the body itself. The stops must have enough surface area to withstand the load applied either by wrench or by actuator. The ability of these stops to handle the loads applied is critical to proper function of the valves. If the stops are too weak, i.e. there is not enough "stopping power", they will quickly yield under load. As the stops yield, they allow the ball to travel further and further from its optimal position in both the open and closed direction. This is referred to as "over travel". Any over travel can have significant, negative effects on valve performance and life, and can result in infantile failure.

Currently, for any DSSV, the correct alignment of the ball in the open and closed position is critical to optimal valve life. Without correct alignment in the open position, the leading edge of the ball and the trailing edge of the lower seat will be exposed to abrasive mud flow, causing premature wear and potentially vortices that can accelerate erosion. The resulting deflected flow path and resulting accelerated erosion can lead to infantile failure.

There are several methods to ensure alignment of the ball in the open and closed positions. Early stop systems incorporated a "stop ring". This ring is a removable ring on the interior of the valve exposed to the drilling fluid, usually adjacent to the upper seat, which provides a flat surface for the stem to come into contact with. Due to the nature and design of the ring, the amount of surface area available to stop against is typically very low. Because of the low amount of surface area, these stop rings cannot resist significant amounts of torque and therefore do not have much stopping power. After only a few uses, any yielding in the stop area will allow the ball to over travel in the open and closed direction. However, one advantage of using stop rings is that they are replaceable. Any yielding of the ring can easily be fixed by simply replacing the ring during regular service.

To improve stopping power, "cam style" stops were invented. These types of stops are typically used in higher pressure valves, and are typically single sided (as opposed to dual stops mentioned below). Typically, these types of stops comprise a cam lobe incorporated into the stem, which mates with a cam feature milled directly into the body. The utilization of a cam allows for much more surface area in the stop, resulting in more accurate, reliable and repeatable alignment under high torque applications. However, by incorporating or integrating the stop into the body itself, either by machining or fabricating the stop in the valve body, they are difficult to inspect, not very corrosion-resistant and non-repairable because they cannot be welded. If the body wears out, it must be replaced which shortens the useful life of the valve at great expense.

A recent innovation to cam style stops is the Dual Stop™ stem, as manufactured by Hi-Kalibre Equipment Limited of Edmonton, Alberta, Canada. In this design, the stem lobes are doubled, for double the stopping power. While this provides even further reliability and improved life in the field, these lobes are still difficult to inspect, not very corrosion resistant and when they eventually wear out, they cannot be repaired.

It is, therefore, desirable to provide a stop mechanism for DSSVs that overcomes the shortcomings of the prior art.

SUMMARY

A modular stop can be provided that incorporates the stops into a removable part. The stops can be integrated into a stem insert. The material of the stem insert can be made from more corrosion resistant alloys, to improve or lengthen the service life of the stop.

In some embodiments, the stops can be manufactured to be either single-sided, or dual-sided. In some embodiments, the modular stop can still comprise a cam and, thus, can provide as much stopping power as conventional cam style stems. In addition, they can have the same repeatability and reliability as the current state of the art.

In some embodiments, the modular stops can be easily removed for inspection or replacement. Replacement of a worn modular stop with a new modular stop can return the valve travel to normal as the wear is contained in the removable insert, which will eliminate replacement of the valve body due to integral stops being worn.

In some embodiments, existing prior art valves can be upgraded or retrofitted to incorporate the modular stop. By machining existing bodies to receive a modular stop, the modular stop can be incorporated into previously manufactured equipment, using the same stems and a new insert and, thus, extend the service life of the valve and improve the accuracy of its operation.

Broadly stated, in some embodiments, a modular stop can be provided for use in a valve, the valve comprising a tubular body and at least one opening disposed through a sidewall thereof, the at least one opening providing communication to a valve chamber disposed within an interior of the body, the at least one opening providing access to a stem configured for turning a ball valve disposed in the tubular body, the stem comprising a cylindrical portion comprising a longitudinal axis extending therethrough, and a cam plate disposed on one end of the cylindrical portion wherein the cam plate is substantially perpendicular to the longitudinal axis, the cam plate comprising at least one cam lobe, the body further comprising a first relief disposed around the at least one opening in the interior adjacent to the valve chamber, the modular stop comprising: a tubular neck portion comprising a first end and a second end, the first end configured for slidable fit into the at least one opening when inserted therein, the tubular neck portion defining a first passageway between the first and second ends, the first passageway configured for slidable fit with the cylindrical portion of the stem when the cylindrical portion is inserted therein; and a base portion disposed on the second end, the base portion larger in diameter than the tubular neck portion, the base portion configured for insertion into the first relief when the tubular neck portion is inserted into the at least one opening, the base portion comprising a second relief configured for receiving the cam plate when the cylindrical portion is inserted into the first passageway, the second relief further comprising at least one stop configured for contacting the at least one cam lobe wherein the stem is limited to approximately 90 degrees of rotational movement about the longitudinal axis when inserted into the modular stop.

Broadly stated, in some embodiments, a valve can be provided for use with a drill string, the valve comprising a tubular body and at least one opening disposed through a sidewall thereof, the at least one opening providing communication to a valve chamber disposed within an interior of the tubular body, the at least one opening providing access to a stem configured for turning a ball valve disposed in the body, the stem comprising a cylindrical portion comprising a longitudinal axis extending therethrough, and a cam plate disposed on one end of the cylindrical portion wherein the cam plate is substantially perpendicular to the longitudinal axis, the cam plate comprising at least one cam lobe, the body further comprising a first relief disposed around the at least one opening in the interior adjacent to the valve chamber, the valve comprising a modular stop further comprising: a tubular neck portion comprising a first end and a second end, the first end configured for slidable fit into the at least one opening when inserted therein, the tubular neck portion defining a first passageway between the first and second ends, the first passageway configured for slidable fit with the cylindrical portion of the stem when the cylindrical portion is inserted therein; and the modular stop further comprising a base portion disposed on the second end, the base portion larger in diameter than the tubular neck portion, the base portion configured for insertion into the first relief when the tubular neck portion is inserted into the at least one opening, the base portion comprising a second relief configured for receiving the cam plate when the cylindrical portion is inserted into the first passageway, the second relief further comprising at least one stop configured for contacting the at least one cam lobe wherein the stem is limited to approximately 90 degrees of rotational movement about the longitudinal axis when inserted into the modular stop.

Broadly stated, in some embodiments, the modular stop can further comprise a seal disposed between it and the tubular body.

Broadly stated, in some embodiments, the second relief can comprise a first stop and a second stop to define the start and stop of the rotational movement.

Broadly stated, in some embodiments, the modular stop can further comprise means for preventing rotation of the base portion when inserted into the first relief.

Broadly stated, in some embodiments, the means can comprise the base portion comprising a cross-sectional shape that is non-circular, wherein the first relief is configured to receive the base portion wherein the modular stop cannot substantially rotate when the base portion is inserted into the first relief.

Broadly stated, in some embodiments, the rotation preventing means can comprise an interference fit between the base portion and the body when the base portion is inserted into the first relief.

Broadly stated, in some embodiments, the rotation preventing means can comprise complimentary splines disposed on the base portion and in the first relief wherein the complimentary splines mesh with each other when the base portion is inserted into the first relief.

Broadly stated, in some embodiments, the rotation preventing means can comprise at least one pin disposed between the body and the base portion wherein the modular stop cannot substantially rotate when the base portion is inserted into the first relief.

Broadly stated, in some embodiments, a method can be provided for manufacturing a valve for use with a modular stop wherein the valve comprises a tubular body and at least one opening disposed through a sidewall thereof, the at least one opening providing communication to a valve chamber disposed within an interior of the tubular body, the at least one opening providing access to a stem configured for turning a ball valve disposed in the body, the stem comprising a cylindrical portion comprising a longitudinal axis extending therethrough, and a cam plate disposed on one end of the cylindrical portion wherein the cam plate is substantially perpendicular to the longitudinal axis, the cam plate comprising at least one cam lobe, the method comprising the steps of: fabricating a first relief disposed around the at least one opening in the interior adjacent to the valve chamber; providing a modular stop, further comprising: a tubular neck portion comprising a first end and a second end, the first end configured for slidable fit into the at least one opening when inserted therein, the tubular neck portion defining a first passageway between the first and second ends, the first passageway configured for slidable fit with the cylindrical portion of the stem when the cylindrical portion is inserted therein, and a base portion disposed on the second end, the base portion larger in diameter than the tubular neck portion, the base portion configured for insertion into the first relief when the tubular neck portion is inserted into the at least one opening, the base portion comprising a second relief configured for receiving the cam plate when the cylindrical portion is inserted into the first passageway, the second relief further comprising at least one stop configured for contacting the at least one cam lobe wherein the stem is limited to approximately 90 degrees of rotational movement about the longitudinal axis when inserted into the modular stop; inserting the tubular neck portion into the at least one opening, wherein the base portion is substantially seated in the first relief; and inserting the cylindrical portion into the first passageway, wherein the cam plate is substantially disposed in the second relief.

Broadly stated, in some embodiments, a method can be provided for retrofitting an existing valve for use with a modular stop wherein the valve comprises a tubular body and at least one opening disposed through a sidewall thereof, the at least one opening providing communication to a valve chamber disposed within an interior of the tubular body, the at least one opening providing access to a stem configured for turning a ball valve disposed in the body, the stem comprising a cylindrical portion comprising a longitudinal axis extending therethrough, and a cam plate disposed on one end of the cylindrical portion wherein the cam plate is substantially perpendicular to the longitudinal axis, the cam plate comprising at least one cam lobe, the method comprising the steps of: fabricating a first relief disposed around the at least one opening in the interior adjacent to the valve chamber; providing a modular stop, further comprising: a tubular neck portion comprising a first end and a second end, the first end configured for slidable fit into the at least one opening when inserted therein, the tubular neck portion defining a first passageway between the first and second ends, the first passageway configured for slidable fit with the cylindrical portion of the stem when the cylindrical portion is inserted therein, and a base portion disposed on the second end, the base portion larger in diameter than the tubular neck portion, the base portion configured for insertion into the first relief when the tubular neck portion is inserted into the at least one opening, the base portion comprising a second relief configured for receiving the cam plate when the cylindrical portion is inserted into the first passageway, the second relief further comprising at least one stop configured for contacting the at least one cam lobe wherein the stem is limited to approximately 90 degrees of rotational movement about the longitudinal axis when inserted into the modular stop; inserting the tubular neck portion into the at least one opening, wherein the base portion is substantially seated in the first relief; and inserting the cylindrical portion into the first passageway, wherein the cam plate is substantially disposed in the second relief.

Broadly stated, in some embodiments, the methods can further comprise the step of fabricating at least one O-ring groove disposed around the tubular neck portion and installing an O-ring into the at least one O-ring groove prior to inserting the tubular neck portion into the at least one opening.

Broadly stated, in some embodiments, the methods can further comprise the step of fabricating a first stop and a second stop in the second relief, to define the start and stop of the rotational movement, prior to seating the base portion in the first relief.

Broadly stated, in some embodiments, the methods can further comprise the step of providing means for preventing rotation of the base portion when inserted into the first relief.

Broadly stated, in some embodiments, the methods can further comprise the steps of: fabricating the base portion to comprise a cross-sectional shape that is non-circular; and fabricating the first relief to receive the base portion wherein the modular stop cannot substantially rotate when the base portion is inserted into the first relief.

Broadly stated, in some embodiments, the methods can further comprise the step of fabricating the base portion such that there is an interference fit between the base portion and the first relief when the base portion is inserted into first relief.

Broadly stated, in some embodiments, the methods can further comprise the step of fabricating complimentary splines disposed on the base portion and in the first relief wherein the complimentary splines mesh with each other when the base portion is inserted into the first relief.

Broadly stated, in some embodiments, the methods can further comprise the step of providing a pin disposed between the body and the base portion wherein the modular stop cannot substantially rotate when the base portion is inserted into the first relief.

DETAILED DESCRIPTION OF EMBODIMENTS

Figure 1:
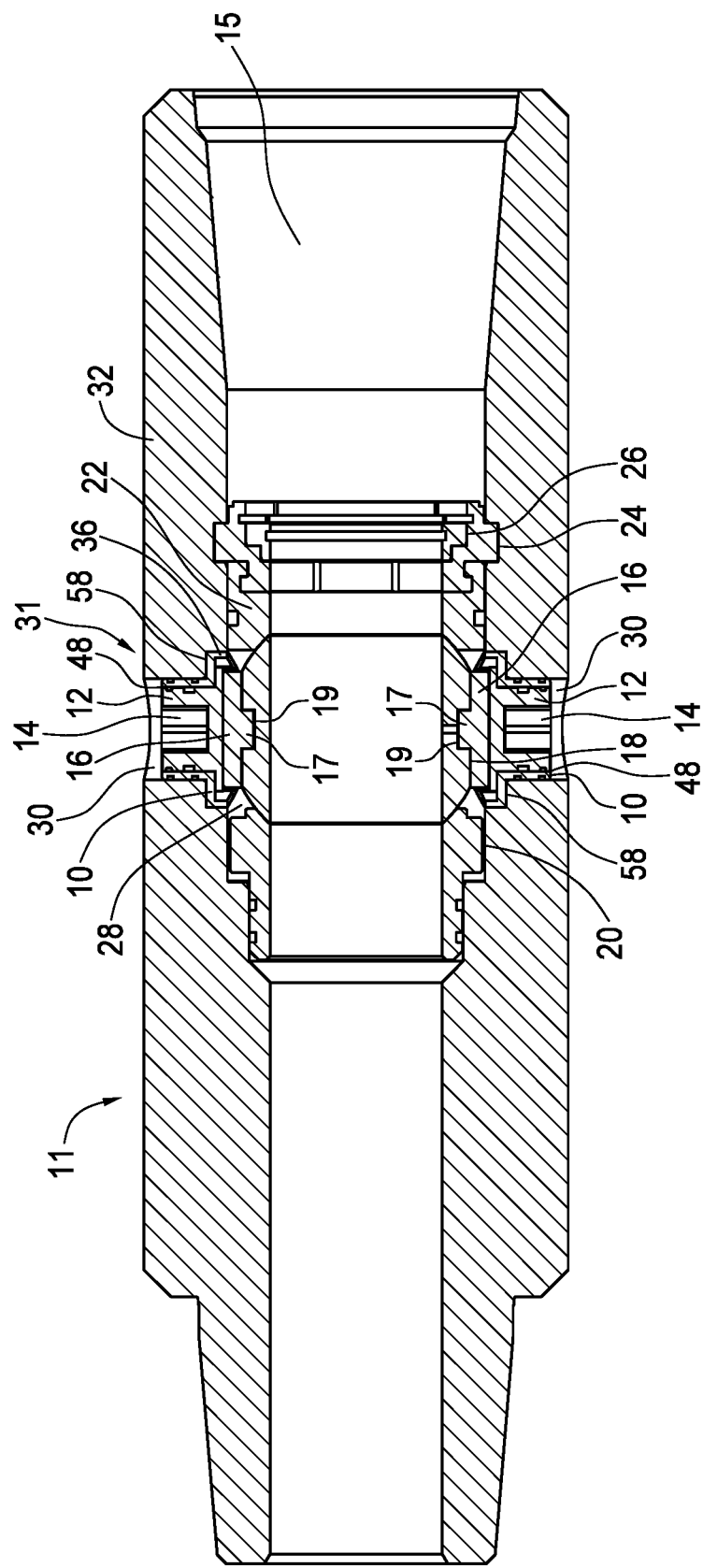
FIG. 1 is a cross-sectional side elevation view depicting a ball valve comprising modular stops.
Figure 2:
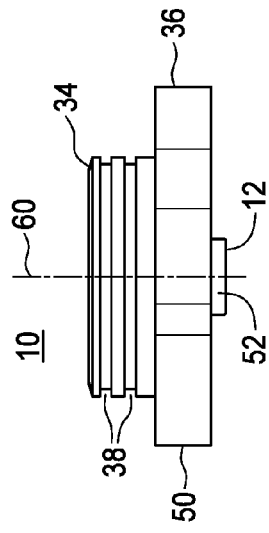
FIG. 2 is a front elevation view depicting one embodiment of a modular stop comprising a single-sided stop.
Figure 3:
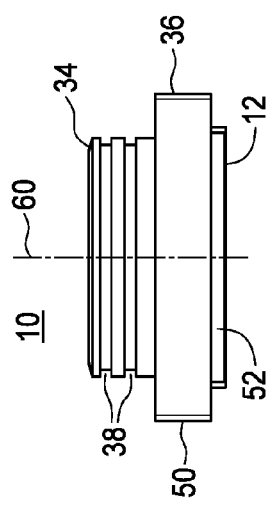
FIG. 3 is a side elevation view depicting the modular stop of FIG. 2.
Figure 5:
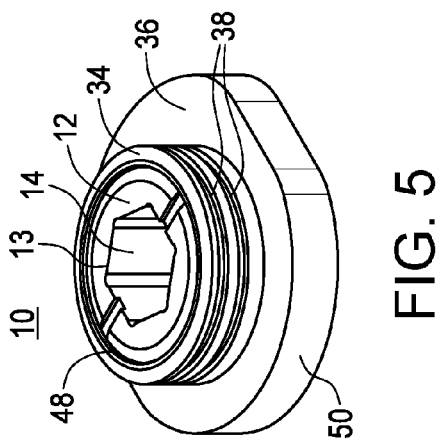
FIG. 5 is a perspective view depicting the modular stop of FIG. 2.

Referring to FIG. 1, one embodiment of modular stops 10 are shown installed in valve 11. In some embodiments, modular stop 10 can be inserted into opening 30 disposed through sidewall 31 of tubular valve body 32, wherein base portion 36 of modular 10 can seat in relief 58 disposed in sidewall 31. In some embodiments, stem 12 can be disposed in passageway 48 disposed through modular stop 10.

In some embodiments, stem 12 can be mechanically connected to ball valve 18 via u-joint 16, which can be position in valve chamber 28 and held in position by lower ball seat 20 and upper ball seat 22, which can be further held in position by split ring 24 and lock ring 26. In some embodiments, u-joint 16 can comprise key 17 that can fit into key slot 19 of ball valve 18. Similarly, u-joint 16 can comprise another key (not shown) configured to fit into a corresponding key slot 56 (as shown in FIG. 8) as well known to those skilled in the art, wherein ball valve 18 can be rotated to close valve 11 by inserting a hex wrench (not shown) into hex opening 14 and rotating the hex wrench approximately 90 degrees to close off passageway 15 extending through valve body 32.

Figure 4:
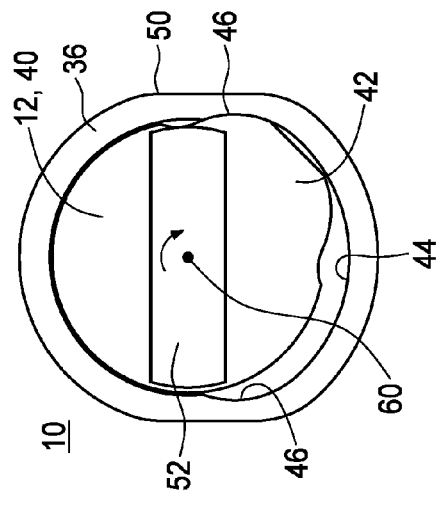
FIG. 4 is a bottom plan view depicting the modular stop of FIG. 2.
Figure 7:
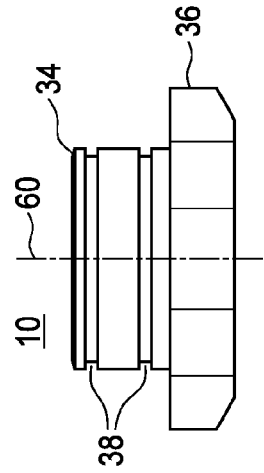
FIG. 7 is side elevation view depicting the modular stop of FIG. 6.
Figure 6:
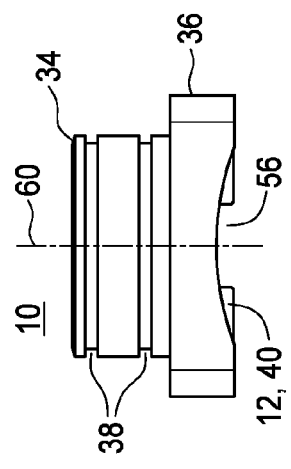
FIG. 6 is a front elevation view depicting another embodiment of a modular stop comprising a dual-sided stop.
Figure 9:
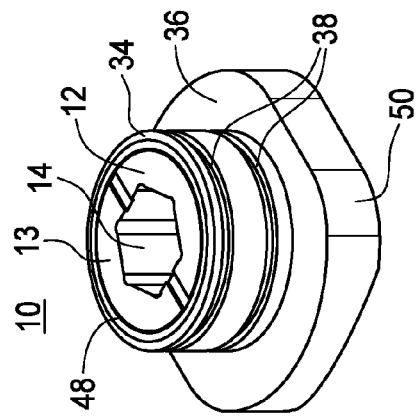
FIG. 9 is a perspective view depicting the modular stop of FIG. 6.

Referring to FIGS. 2 to 5, one embodiment of modular stop 10 is shown, wherein this embodiment can comprise a singular or single-sided stop. In this embodiment, modular stop 10 can comprise neck portion 34 and base portion 36, which can be larger in diameter than neck portion 34. In some embodiments, modular stop 10 can comprise a seal placed between it and valve body 32 and/or relief 58 to provide means to prevent produced substances, such as fluids and gases from passing through opening 30 when modular stop 10 is installed therein. In some embodiments, this seal can comprise neck portion 34 comprising at least one O-ring groove 38 disposed therearound to receive an O-ring (not shown), as well known to those skilled in the art, to provide sealing means when neck portion 34 is inserted into opening 30 of valve body 32. Stem 12 can comprise cylindrical portion 13, which can be configured to be inserted into passageway 48 disposed through neck portion 34. In some embodiments, stem 12 can comprise key 52 extending outwardly from cam plate 40, which can serve as means to engage key slot 19 on ball valve 18 without the need of u-joint 16. In some embodiments, base portion 36 can comprise cam profile or relief 44, which can be configured to receive cam plate 40. In this embodiment, cam plate 40 can comprise a single cam lobe 42, which can be configured to contact stops 46 when stem 12 is rotated approximately through 90 degrees of rotation about longitudinal axis 60 from one stop 46 to the other stop 46. As shown in FIG. 4, stem 12 can rotate in a clockwise direction from contacting right-hand stop 46 to left-hand stop 46, which represents approximately 90 degrees of rotation about longitudinal axis 60. In some embodiments, to prevent modular stop 10 from rotating when inserted into relief 58 disposed in valve chamber 28 of valve body 32, base portion 36 can comprise a cross-sectional shape that is non-circular, as represented by reference numeral 50, that can be inserted into relief 58, wherein relief 58 can be configured to receive cross-sectional shape 50 of base portion 36 and prevent the rotation thereof about longitudinal axis 60.

Figure 8:
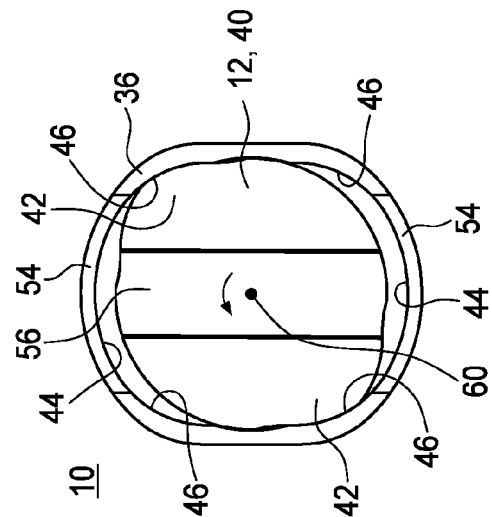
FIG. 8 is a bottom plan view depicting the modular stop of FIG. 6.

Referring to FIGS. 6 to 9, another embodiment of modular stop 10 is shown, wherein this embodiment can comprise a dual or double-sided stop. In this embodiment, modular stop 10 can comprise neck portion 34 and base portion 36, which can be larger in diameter than neck portion 34. In some embodiments, modular stop 10 can comprise a seal placed between it and valve body 32 and/or relief 58 to provide means to prevent produced substances, such as fluids and gases from passing through opening 30 when modular stop 10 is installed therein. In some embodiments, this seal can comprise neck portion 34 comprising at least one O-ring groove 38 disposed therearound to receive an O-ring (not shown), as well known to those skilled in the art, to provide sealing means when neck portion 34 is inserted into opening 30 of valve body 32. Stem 12 can comprise cylindrical portion 13, which can be configured to be inserted into passageway 48 disposed through neck portion 34. In some embodiments, stem 12 can comprise key slot 56 extending across cam plate 40, which can serve as means to engage u-joint 16 that, in turn, can engage key slot 19 on ball valve 18, as shown in FIG. 1. In some embodiments, base portion 36 can comprise cam profile or relief 44, which can be configured to receive cam plate 40. In this embodiment, cam plate 40 can comprise two cam lobes 42, which can be placed diagonally opposed to each other across cam plate 40, as shown in FIG. 8. In some embodiments, cam lobes 42 can be configured to contact stops 46 when stem 12 is rotated approximately through 90 degrees of rotation about longitudinal axis 60 from one stop 46 to the other stop 46. As shown in FIG. 8, stem 12 can rotate in a clockwise direction from contacting stops 46 located on the upper right and lower left of FIG. 8, to stops 46 located on the upper left and lower right, wherein the rotation represents approximately 90 degrees of rotation about longitudinal axis 60. In some embodiments, to prevent modular stop 10 from rotating when inserted into relief 58 disposed in valve chamber 28 of valve body 32, base portion 36 can comprise a cross-sectional shape that is non-circular, as represented by reference numeral 50, that can be inserted into relief 58, wherein relief 58 can be configured to receive cross-sectional shape 50 of base portion 36 and prevent the rotation thereof about longitudinal axis 60.

In some embodiments, the non-circular cross-sectional shape of base portion 36 can represent means for preventing the rotation of modular stop 10 when inserted into relief 58. In some embodiments, the rotation prevention means can comprise an interference fit between base portion 36 and relief 58 when modular stop 10 is inserted into relief 58. In other embodiments, the rotation prevention means can comprise complimentary splines disposed about base portion 36 and in relief 58, as well known to those skilled in the art, wherein the complimentary splines engage each other when base portion 36 is inserted into relief 58. In other embodiments, the rotation prevention means can comprise at least one pin disposed between modular stop 10 and valve body 32 when base portion 36 is inserted into relief 58, wherein the at least one pin is configured to engage both modular stop 10 and valve body 32 and prevent the rotation of modular stop 10 about longitudinal axis 60.

Figure 10:
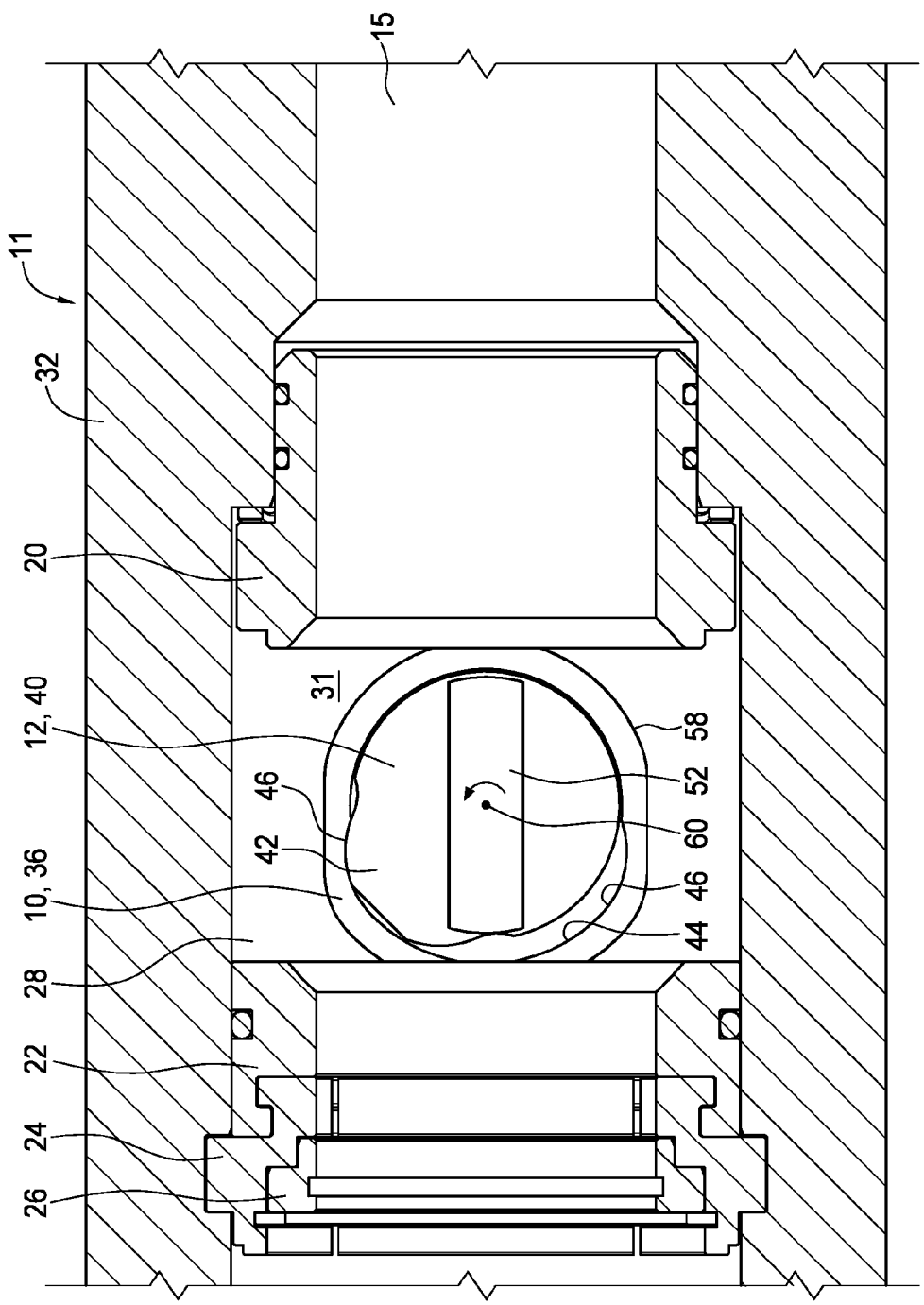
FIG. 10 is a cross-sectional side elevation view depicting a valve comprising the modular stop of FIG. 2.

Referring to FIG. 10, an illustration of a single-sided modular stop 10 installed in relief 58 of valve body 32 is provided. As shown in FIG. 10, stem 12 can rotate in a counter-clockwise direction from contacting upper stop 46 to lower stop 46, wherein the rotation represents approximately 90 degrees of rotation about longitudinal axis 60, and wherein key 52 would move from a substantially horizontal orientation to a substantially vertical orientation.

Figure 11:
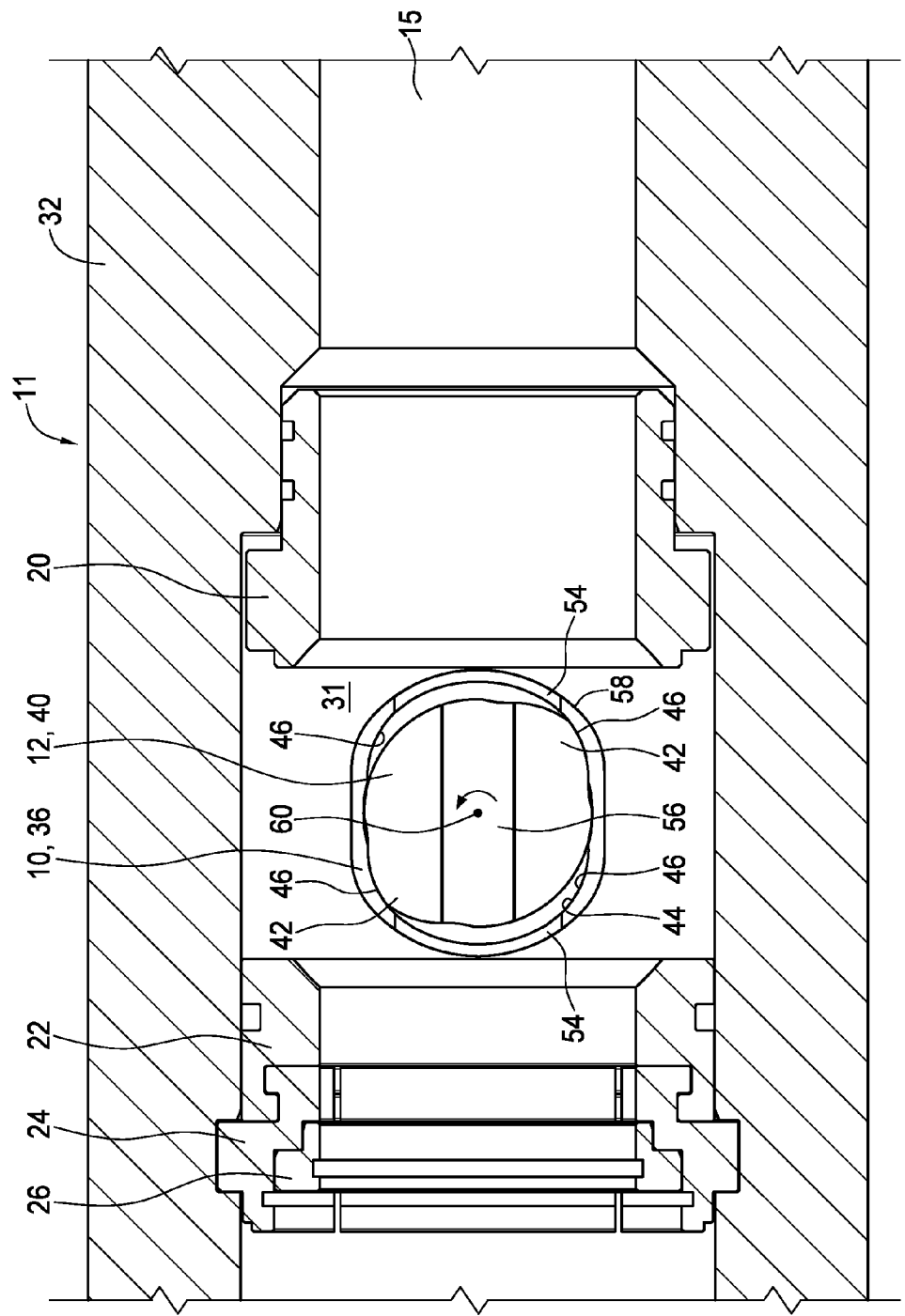
FIG. 11 is a cross-sectional side elevation view depicting a valve comprising the modular stop of FIG. 6.

Referring to FIG. 11, an illustration of a double-sided modular stop 10 installed in relief 58 of valve body 32 is provided. As shown in FIG. 11, stem 12 can rotate in a counter-clockwise direction from contacting stops 46 located on the upper left and lower right of FIG. 11, to stops 46 located on the upper right and lower right, wherein the rotation represents approximately 90 degrees of rotation about longitudinal axis 60, and wherein key slot 56 would move from a substantially horizontal orientation to a substantially vertical orientation.

In some embodiments, modular stop 10 can be comprised of bronze, as well as other wear-resistant materials, such as copper alloys, stainless steel, monel and iconel as well known to those skilled in the art. In so doing, modular stop 10 can be manufactured of materials that have better wear characteristics than the high strength carbon steel used in the manufacture of valve body 32. In some embodiments, stem 12 can be comprised of 17-4 stainless steel, as well as other wear-resistant materials, such as copper alloys, bronze alloys, monel and iconel as well known to those skilled in the art.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A method for manufacturing a valve for use with a modular stop wherein the valve comprises a tubular body and at least one opening disposed through a sidewall thereof, the at least one opening providing communication to a valve chamber disposed within an interior of the tubular body, the at least one opening providing access to a stem configured for turning a ball valve disposed in the body, the stem comprising a cylindrical portion comprising a longitudinal axis extending therethrough, and a cam plate disposed on one end of the cylindrical portion wherein the cam plate is substantially perpendicular to the longitudinal axis, the cam plate comprising at least one cam lobe, the method comprising the steps of:
   a) fabricating a first relief disposed around the at least one opening in the interior adjacent to the valve chamber;
   b) providing a modular stop, further comprising:
      i) a tubular neck portion comprising a first end and a second end, the first end configured for slidable fit into the at least one opening when inserted therein, the tubular neck portion defining a first passageway between the first and second ends, the first passageway configured for slidable fit with the cylindrical portion of the stem when the cylindrical portion is inserted therein, and
      ii) a base portion disposed on the second end, the base portion larger in diameter than the tubular neck portion, the base portion configured for insertion into the first relief when the tubular neck portion is inserted into the at least one opening, the base portion comprising a second relief configured for receiving the cam plate when the cylindrical portion is inserted into the first passageway, the second relief further comprising at least one stop configured for contacting the at least one cam lobe wherein the stem is limited to approximately 90 degrees of rotational movement about the longitudinal axis when inserted into the modular stop;
   c) inserting the tubular neck portion into the at least one opening, wherein the base portion is substantially seated in the first relief; and
   d) inserting the cylindrical portion into the first passageway, wherein the cam plate is substantially disposed in the second relief.

2. The method as set forth in claim 1, further comprising the step of fabricating at least one O-ring groove disposed around the tubular neck portion and installing an O-ring into the at least one O-ring groove prior to inserting the tubular neck portion into the at least one opening.

3. The method as set forth in claim 1, further comprising the step of fabricating a first stop and a second stop in the second relief, to define the start and stop of the rotational movement, prior to seating the base portion in the first relief.

4. The method as set forth in claim 1, further comprising the step of providing means for preventing rotation of the base portion when inserted into the first relief.

5. The method as set forth in claim 4, further comprising the steps of:
   a) fabricating the base portion to comprise a cross-sectional shape that is non-circular; and
   b) fabricating the first relief to receive the base portion wherein the modular stop cannot substantially rotate when the base portion is inserted into the first relief.

6. The method as set forth in claim 4, further comprising the step of fabricating the base portion such that there is an interference fit between the base portion and the first relief when the base portion is inserted into first relief.

7. The method as set forth in claim 4, further comprising the step of fabricating complimentary splines disposed on the base portion and in the first relief wherein the complimentary splines mesh with each other when the base portion is inserted into the first relief.

8. The method as set forth in claim 4, further comprising the step of providing a pin disposed between the body and the base portion wherein the modular stop cannot substantially rotate when the base portion is inserted into the first relief.

9. A method for retrofitting an existing valve for use with a modular stop wherein the valve comprises a tubular body and at least one opening disposed through a sidewall thereof, the at least one opening providing communication to a valve chamber disposed within an interior of the tubular body, the at least one opening providing access to a stem configured for turning a ball valve disposed in the body, the stem comprising a cylindrical portion comprising a longitudinal axis extending therethrough, and a cam plate disposed on one end of the cylindrical portion wherein the cam plate is substantially perpendicular to the longitudinal axis, the cam plate comprising at least one cam lobe, the method comprising the steps of:
   a) fabricating a first relief disposed around the at least one opening in the interior adjacent to the valve chamber;
   b) providing a modular stop, further comprising:
      i) a tubular neck portion comprising a first end and a second end, the first end configured for slidable fit into the at least one opening when inserted therein, the tubular neck portion defining a first passageway between the first and second ends, the first passageway configured for slidable fit with the cylindrical portion of the stem when the cylindrical portion is inserted therein, and
      ii) a base portion disposed on the second end, the base portion larger in diameter than the tubular neck portion, the base portion configured for insertion into the first relief when the tubular neck portion is inserted into the at least one opening, the base portion comprising a second relief configured for receiving the cam plate when the cylindrical portion is inserted into the first passageway, the second relief further comprising at least one stop configured for contacting the at least one cam lobe wherein the stem is limited to approximately 90 degrees of rotational movement about the longitudinal axis when inserted into the modular stop;
   c) inserting the tubular neck portion into the at least one opening, wherein the base portion is substantially seated in the first relief; and
   d) inserting the cylindrical portion into the first passageway, wherein the cam plate is substantially disposed in the second relief.

10. The method as set forth in claim 9, further comprising the step of fabricating at least one O-ring groove disposed around the tubular neck portion and installing an O-ring into the at least one O-ring groove prior to inserting the tubular neck portion into the at least one opening.

11. The method as set forth in claim 9, further comprising the step of fabricating a first stop and a second stop in the second relief, to define the start and stop of the rotational movement, prior to seating the base portion in the first relief.

12. The method as set forth in claim 9, further comprising the step of providing means for preventing rotation of the base portion when inserted into the first relief.

13. The method as set forth in claim 12, further comprising the steps of:

a) fabricating the base portion to comprise a cross-sectional shape that is non-circular; and
b) fabricating the first relief to receive the base portion wherein the modular stop cannot substantially rotate when the base portion is inserted into the first relief.

14. The method as set forth in claim 12, further comprising the step of fabricating the base portion such that there is an interference fit between the base portion and the first relief when the base portion is inserted into first relief.

15. The method as set forth in claim 12, further comprising the step of fabricating complimentary splines disposed on the base portion and in the first relief wherein the complimentary splines mesh with each other when the base portion is inserted into the first relief.

16. The method as set forth in claim 12, further comprising the step of providing a pin disposed between the body and the base portion wherein the modular stop cannot substantially rotate when the base portion is inserted into the first relief.

17. A modular stop for use in a valve, the valve comprising a tubular body and at least one opening disposed through a sidewall thereof, the at least one opening providing communication to a valve chamber disposed within an interior of the body, the at least one opening providing access to a stem configured for turning a ball valve disposed in the tubular body, the stem comprising a cylindrical portion comprising a longitudinal axis extending therethrough, and a cam plate disposed on one end of the cylindrical portion wherein the cam plate is substantially perpendicular to the longitudinal axis, the cam plate comprising at least one cam lobe, the body further comprising a first relief disposed around the at least one opening in the interior adjacent to the valve chamber, the modular stop comprising:
   a) a tubular neck portion comprising a first end and a second end, the first end configured for slidable fit into the at least one opening when inserted therein, the tubular neck portion defining a first passageway between the first and second ends, the first passageway configured for slidable fit with the cylindrical portion of the stem when the cylindrical portion is inserted therein; and
   b) a base portion disposed on the second end, the base portion larger in diameter than the tubular neck portion, the base portion configured for insertion into the first relief when the tubular neck portion is inserted into the at least one opening, the base portion comprising a second relief configured for receiving the cam plate when the cylindrical portion is inserted into the first passageway, the second relief further comprising at least one stop configured for contacting the at least one cam lobe wherein the stem is limited to approximately 90 degrees of rotational movement about the longitudinal axis when inserted into the modular stop.

18. The modular stop as set forth in claim 17, wherein the modular stop further comprises a seal disposed between it and the tubular body.

19. The modular stop as set forth in claim 17, wherein the second relief comprises a first stop and a second stop to define the start and stop of the rotational movement.

20. The modular stop as set forth in claim 17, further comprising means for preventing rotation of the base portion when inserted into the first relief.

21. The modular stop as set forth in claim 20, wherein the means comprises the base portion comprises a cross-sectional shape that is non-circular, wherein the first relief is configured to receive the base portion wherein the modular stop cannot substantially rotate when the base portion is inserted into the first relief.

22. The modular stop as set forth in claim 20, wherein the means comprises an interference fit between the base portion and the body when the base portion is inserted into the first relief.

23. The modular stop as set forth in claim 20, wherein the means comprises complimentary splines disposed on the base portion and in the first relief wherein the complimentary splines mesh with each other when the base portion is inserted into the first relief.

24. The modular stop as set forth in claim 20, wherein the means comprises at least one pin disposed between the body and the base portion wherein the modular stop cannot substantially rotate when the base portion is inserted into the first relief.

25. A valve for use with a drill string, the valve comprising a tubular body and at least one opening disposed through a sidewall thereof, the at least one opening providing communication to a valve chamber disposed within an interior of the tubular body, the at least one opening providing access to a stem configured for turning a ball valve disposed in the body, the stem comprising a cylindrical portion comprising a longitudinal axis extending therethrough, and a cam plate disposed on one end of the cylindrical portion wherein the cam plate is substantially perpendicular to the longitudinal axis, the cam plate comprising at least one cam lobe, the body further comprising a first relief disposed around the at least one opening in the interior adjacent to the valve chamber, the valve comprising a modular stop further comprising:
   a) a tubular neck portion comprising a first end and a second end, the first end configured for slidable fit into the at least one opening when inserted therein, the tubular neck portion defining a first passageway between the first and second ends, the first passageway configured for slidable fit with the cylindrical portion of the stem when the cylindrical portion is inserted therein; and
   b) the modular stop further comprising a base portion disposed on the second end, the base portion larger in diameter than the tubular neck portion, the base portion configured for insertion into the first relief when the tubular neck portion is inserted into the at least one opening, the base portion comprising a second relief configured for receiving the cam plate when the cylindrical portion is inserted into the first passageway, the second relief further comprising at least one stop configured for contacting the at least one cam lobe wherein the stem is limited to approximately 90 degrees of rotational movement about the longitudinal axis when inserted into the modular stop.

26. The valve as set forth in claim 25, wherein the modular stop further comprises a seal disposed between it and the tubular body.

27. The valve as set forth in claim 25, wherein the second relief comprises a first stop and a second stop to define the start and stop of the rotational movement.

28. The valve as set forth in claim 25, further comprising means for preventing rotation of the base portion when inserted into the first relief.

29. The valve as set forth in claim 28, wherein the means comprises the base portion comprises a cross-sectional shape that is non-circular, wherein the first relief is configured to receive the base portion wherein the modular stop cannot substantially rotate when the base portion is inserted into the first relief.

30. The valve as set forth in claim 28, wherein the means comprises an interference fit between the base portion and the body when the base portion is inserted into the first relief.

31. The valve as set forth in claim 28, wherein the means comprises complimentary splines disposed on the base portion and in the first relief wherein the complimentary splines mesh with each other when the base portion is inserted into the first relief.

32. The valve as set forth in claim 28, wherein the means comprises at least one pin disposed between the body and the base portion wherein the modular stop cannot substantially rotate when the base portion is inserted into the first relief.

* * * * *